United States Patent [19]
Dove et al.

[11] Patent Number: 6,078,588
[45] Date of Patent: Jun. 20, 2000

[54] QUEUING APPARATUS AND METHOD FOR AVOIDING ADDRESS COLLISION OF DATA IN A PLURALITY OF FRAMES

[75] Inventors: Jason W. Dove, Novato; Rodney Witel, Rohnert Park; Brian Semple, Novato, all of Calif.

[73] Assignee: Alcatel USA Sourcing, L.P., Plano, Tex.

[21] Appl. No.: 08/993,188

[22] Filed: Dec. 18, 1997

[51] Int. Cl.[7] .............................. H04L 12/28; H04L 12/56
[52] U.S. Cl. ............................. 370/412; 370/392
[58] Field of Search .................... 370/412, 428, 370/392, 394, 429, 445, 476, 242, 246, 247; 710/4, 9, 39, 40; 340/825.52

[56] References Cited

U.S. PATENT DOCUMENTS

| | | | |
|---|---|---|---|
| 4,516,122 | 5/1985 | Tomikawa | 340/825.5 |
| 4,536,874 | 8/1985 | Stoffel et al. | 370/85 |
| 4,586,176 | 4/1986 | Miyao | 370/85 |
| 4,751,701 | 6/1988 | Roos et al. | 370/85 |
| 5,012,467 | 4/1991 | Crane | 370/85.3 |
| 5,495,478 | 2/1996 | Wilkinson et al. | 370/58.2 |
| 5,526,349 | 6/1996 | Diaz et al. | 370/58.1 |
| 5,528,592 | 6/1996 | Schibler et al. | 370/60.1 |
| 5,537,400 | 7/1996 | Diaz et al. | 370/58.2 |
| 5,592,480 | 1/1997 | Carney et al. | 370/347 |
| 5,612,958 | 3/1997 | Sannino | 370/394 |
| 5,623,491 | 4/1997 | Skoog | 370/397 |
| 5,629,937 | 5/1997 | Hayter et al. | 370/233 |
| 5,664,114 | 9/1997 | Krech, Jr. et al. | 395/200.64 |
| 5,671,249 | 9/1997 | Andersson et al. | 375/211 |

*Primary Examiner*—Ajit Patel
*Assistant Examiner*—Duc Ho
*Attorney, Agent, or Firm*—Fliesler, Dubb, Meyer & Lovejoy

[57] ABSTRACT

A queuing apparatus for avoiding address collision in a plurality of frames received from different interfaces includes a queuing memory 2, an address collision detector 16 which generates a frame offset for a succeeding frame colliding with its preceding frame, and a frame offset device 14 coupled to the address collision detector 16 to offset the address of the succeeding frame in response to detecting the address collision. A method of queuing the frames includes the steps of detecting an address collision between the preceding and the succeeding frames and repositioning at least some of the frames to eliminate the address collision.

93 Claims, 4 Drawing Sheets

QUEUING APPARATUS AND METHOD FOR AVOIDING ADDRESS COLLISION OF DATA IN A PLURALITY OF FRAMES

BACKGROUND OF THE INVENTION

1. Field of the Invention

The present invention relates to a queuing apparatus and method for avoiding address collision of data in a plurality of frames, and more particularly, to a queuing apparatus and method for avoiding address collision in a data communications network.

2. Background

The telecommunications industry has developed systems for transmission and reception of digital data signals organized in a plurality of temporal frames, such as synchronous optical network (SONET) frames. The SONET is an industry-standard optical network that is used for the transmission of various types of communication signals, such as telephony and video signals. The SONET frames are organized in a plurality of superframes, each superframe having a duration of 1 ms and consists of 8 frames each having a duration of 125 μs. Digital data originating from a plurality of channels may be multiplexed by using the technique of time division multiplexing (TDM) and formatted into a plurality of asynchronous transfer mode (ATM) cells for transmission over a SONET physical layer interface. A SONET frame may consist of a plurality of ATM cells including at least some of the ATM cells which contain TDM data that have been formatted into the cells. In order to demultiplex the TDM data in the cells upon reception, it is important that the cells be queued in the receive direction to allow for frame realignment and reformatting such that the queued cells can be properly received into the isochronous environment of the SONET receiver without data collision. Since multiple physical layer devices usually share the same receive interface, it is important that separate receive queues be maintained for the interfaces receiving the respective frames. Various factors, such as fiber loop delays which may vary by more than one SONET frame duration and may differ from interface to interface, may contribute to the address collision of data in the TDM cells of different frames at the receive interface from time to time. Therefore, there is a need for a queuing apparatus and method to avoid the address collision of data in different frames by repositioning the start of the frames in a temporal sequence.

SUMMARY OF THE INVENTION

The present invention satisfies this need. In view of the above problems, the present invention provides a queuing apparatus and method that is able to detect an address collision of data in different frames and in response, to reset at least one of the frames by at least one frame delay to avoid the address collision. In accordance with the present invention, the apparatus roughly comprises:

(a) a queuing memory capable of storing a plurality of frames including a preceding frame and a succeeding frame, the queuing memory including an input address port and an output address port;

(b) a frame offset device coupled to the input address port of the queuing memory; and (c) an address collision detector coupled to the input and output address ports of the queuing memory to detect an address collision between the preceding and succeeding frames in the plurality of frames, and further coupled to the frame offset device to offset the succeeding frame in response to detecting the address collision.

In a further embodiment, an input pointer generator is provided to clock the frame offset device and to generate a write signal to the queuing memory. In yet a further embodiment, an output counter generator is provided to generate an output counter signal to allow the address collision detector to detect a collision of data in the cells of different frames.

The present invention also provides a method of queuing a plurality of frames including a preceding frame and a succeeding frame, comprising the steps of:

(a) receiving the plurality of frames;

(b) detecting an address collision between the preceding and succeeding frames; and (c) repositioning at least some of the frames to eliminate the address collision.

Advantageously, the apparatus and method according to the present invention is able to offset a succeeding frame by at least one frame duration upon detecting an address collision between the succeeding frame and its preceding frame. The present invention allows different frames received from a plurality of physical layer interfaces to be received by a receiver interface in a single receive queue without data collision between the different frames.

BRIEF DESCRIPTION OF THE DRAWINGS

The invention will be described with respect to particular embodiments thereof, and references will be made to the drawings in which.

DETAILED DESCRIPTION

Figure 1:
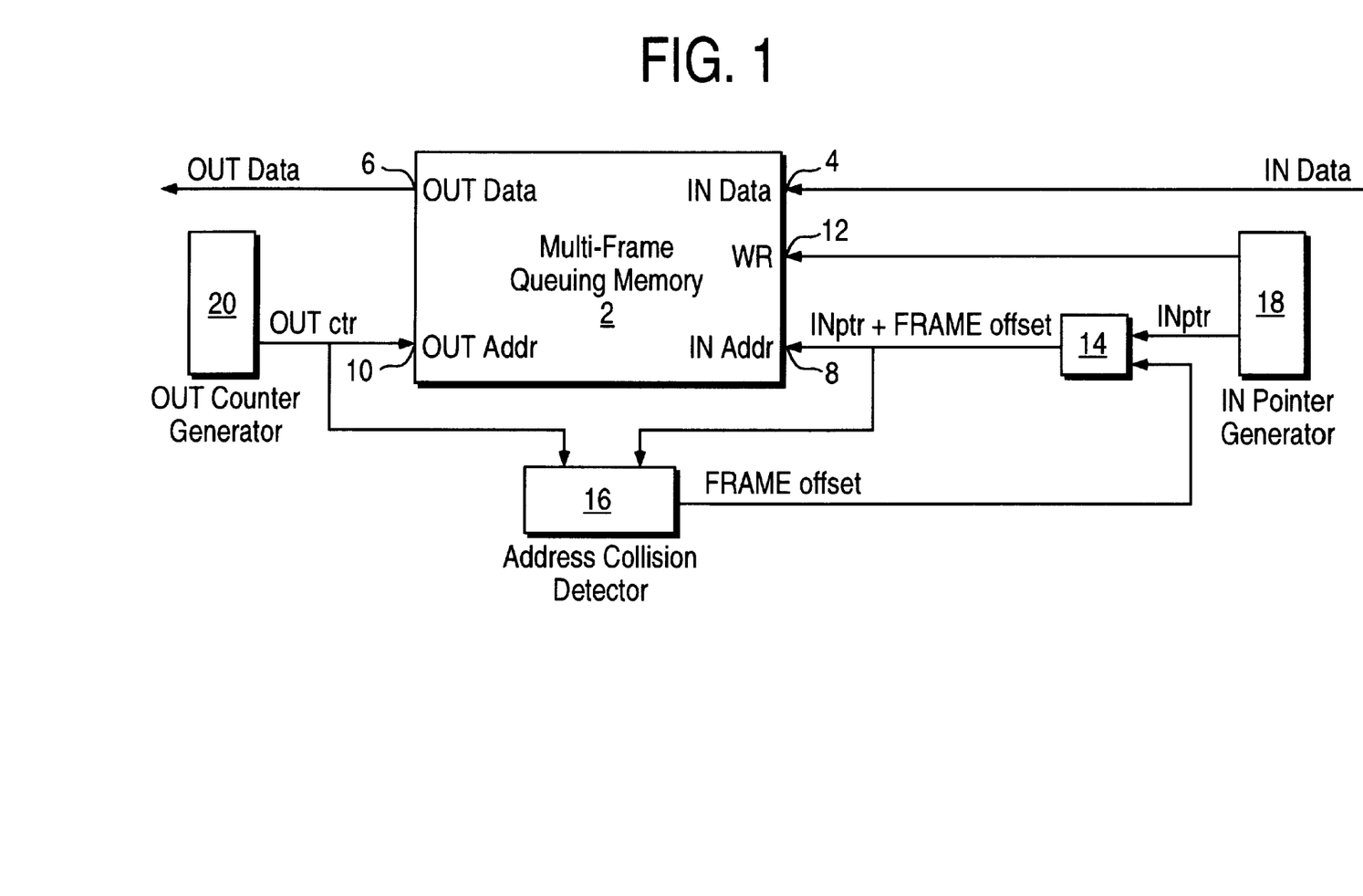
FIG. 1 is a block diagram of the queuing apparatus according to the present invention.

FIG. 1 shows a block diagram of a queuing apparatus in accordance with the present invention. The queuing apparatus includes a queuing memory 2 which is capable of storing a plurality of frames, and usually includes an input data port 4, and output data 6, an input address port 8, an output address port 10, and a write port 12. The queuing memory 2 should have sufficient memory capacity to store at least three frames of data, and may have a memory capacity to store four or more frames of data. The input data port 4 is adapted to receive data in a plurality of frames originated from a plurality of physical interfaces. The output data port 6 is adapted to transmit the data in the frames in a single queue, also known as a single frame domain, such that the queued frames can be received by a receive interface such as a synchronous optical network (SONET) receive interface, for example, a SONET octal bus. The input and output address ports 8 and 10 are provided to assign the addresses of the input and output data in the frames, respectively. The write port 12 is provided to receive a write command which signifies to the queuing memory 2 that a data frame is being input into the queuing memory 2 from the input data port 4.

A frame offset device 14 is coupled to the input address port 8 of the queuing memory 2 to offset a succeeding frame if there is an address collision between the succeeding frame and its preceding frame. An address collision detector 16 is coupled to the input and output address ports 8 and 10 of the queuing memory 2 to detect an address collision between different frames. For example, the address collision detector 16 can detect an address collision by comparing the addresses of the input data and the output data, which are supposed to be positioned in different frames at any given time. If the address collision detector 16 finds that any of the addresses of the data cells in the different frames coincide with each other, the address collision detector 16 generates a frame offset signal to the frame offset device 14 to offset the succeeding frame at the input data port 4 by changing the address of the input data at the input address port 8. The address collision detector 16 is coupled to the frame offset device 14 such that the frame offset signal generated by the address collision detector 16 directs the frame offset device to offset the succeeding frame only if there is an address collision.

In general, the frame offset device 14 is adapted to offset a succeeding frame at the input data port 4 of the queuing memory 2 by changing its address at the input address port 8 to further delay the arrival of the start of the succeeding frame at the input data port 4 with respect to its preceding frame. In the case of SONET frames, the succeeding frame can be offset in one frame increments by increasing its SONET frame number by one at a time. By changing the address of the succeeding frame at the input address port 8 using the frame offset device 14, the succeeding frame is delayed in time by at least one frame duration in the queuing memory 2 in response to the frame offset signal from the address collision detector 16.

In a further embodiment, an input pointer generator 18 is coupled to the write port 12 and the frame offset device 14 and provides an input pointer that signifies the address of the input frame to the frame offset device 14 and to the write port 12 of the queuing memory 2. If there is no address collision detected by the address collision detector 16, the frame offset device 14 simply relays the input pointer to the input address port 8 of the queuing memory 2. The input pointer may simply be frame bits that represent the frame number of the input frame. If the address collision detector 16 detects an address collision between the input and output addresses at the input and output address ports 8 and 10, respectively, the frame offset device 14 adds a frame offset number to the input pointer to generate a new input address, and transmits this new input address to the input address port 8 of the queuing memory 2.

To simplify the process of delaying the succeeding frame in response to detecting an address collision, more specifically in the case of queuing SONET frames, the frame number should be increased in integral increments of at least one. The succeeding frame is thus delayed by at least one frame duration and may be further delayed by an integral number of frames even though the overlap between the succeeding and preceding frames is only partial. For example, if there is only an overlap between some of the data cells near the end of a preceding frame and some of the data cells near the start of a succeeding frame, the address collision detector 16 generates a frame offset signal to the frame offset device 14, which adds a frame offset of one to the input pointer to change the input address of the succeeding frame in the queuing memory 2 such that its frame number is increased by one.

In yet a further embodiment, the queuing apparatus includes an output counter generator 20 which is coupled to provide an output counter to the output address port 10 of the queuing memory 2. The output counter generator 20 is also coupled to provide the output address to the address collision detector 16, which compares the input and output addresses at the input and output address ports 8 and 10, respectively, of the queuing memory 2. Upon detecting an address collision, that is, a coincidence of input and output addresses, the address collision detector 16 generates a frame offset signal signifying a delay of a predetermined number of frames, for example, a delay of one frame, to the frame offset device 14 which adds the number of frames of delay to the input pointer to result in a new input address for the succeeding frame. If the new input address for the succeeding frame still coincides with the output address generated by the output counter 20, the address collision detector 16 can further delay the succeeding frame by further increasing the frame offset to the input pointer. The process of delaying the succeeding frame in one frame increments may be repeated until there is no address collision between the input and output addresses at the input and output address ports 8 and 10, respectively. In the example in which the address collision detector 16 is adapted to generate a frame offset of one frame at a time, the address collision detector 16 may comprise a monostable multivibrator, also commonly known as "one-shot," which generates a digital pulse upon detecting a discrepancy between two digital inputs, in this case the input and output addresses at the input and output address ports 8 and 10, respectively, of the queuing memory 2.

Figure 2:
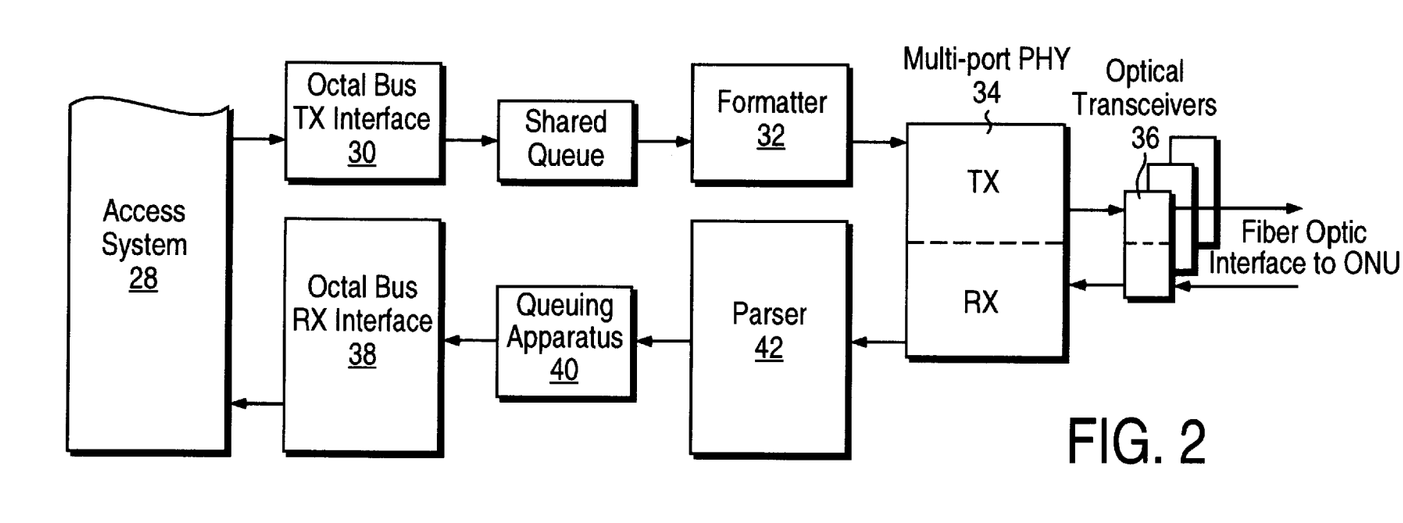
FIG. 2 is a block diagram showing an example of a SONET communication system in which the queuing apparatus of FIG. 1 may be implemented.

FIG. 2 shows a block diagram illustrating a SONET communications network in which the queuing apparatus according to the present invention may be implemented. The system comprises a transmitter 30 which usually includes a transmit interface such as a SONET octal bus transmit interface, which is connected to a SONET access system 28 to transmit a plurality of frames in a shared queue, that is, in a serial sequence. The formatter 32 can be coupled to receive the shared queue to format the data cells in a frame to carry different types of signals. For example, telephony signals which are usually in a time division multiplexed (TDM) format may be converted into an asynchronous transfer mode (ATM) format and interspersed with ATM cells that carry video signals in each SONET frame. A physical layer device 34, which is usually a multi-port physical layer interface, is coupled to the formatter 32 to transmit the formatted cells in the SONET frames to a plurality of transceivers 36, such as optical transceivers, over a plurality of ports. The optical transceivers 36 may be connected via a plurality of fiber optic interfaces to optical network units (ONUs). In general, the multi-port physical layer interface 34 is adapted to convey both transmit and receive signals in the SONET frames in upstream and downstream directions, respectively.

A receiver 38, which usually comprises a receive interface such as a SONET octal bus receive interface connected to the SONET access system 28, is coupled to the physical layer device 34 through a queuing apparatus 40, an embodiment of which is shown in FIG. 1 and described above. A parser 42 may be connected between the queuing apparatus 40 and the physical layer device 34 to separate the received signals from the physical layer device 34 into a plurality of frames. The direction in which the transmitted signals flow from the transmit interface 30 to the optical transceivers 36 is usually said to be a downstream direction, whereas the direction in which the received signals flow from the optical transceivers 36 to the receive interface 38 is usually said to be an upstream direction. Although the parser 42 separates the received data signals into a plurality of SONET frames, it does not assure that different SONET frames received from different fiber optic interfaces are properly positioned in a receive queue without any overlap between the frames.

The queuing apparatus 40, which is illustrated in FIG. 1 and described above, is able to detect address collisions between different frames and to delay the start of a succeeding frame with respect to its preceding frame with which the succeeding frame has collided. As described above, the succeeding frame may be offset by delaying the succeeding frame by one frame duration at a time until an address collision is avoided between the preceding and succeeding frames. Sufficient memory capacity should be provided for in the queuing memory 2 of FIG. 1 such that the queuing memory 2 is able to store the succeeding frame when it is delayed by at least one frame duration. The queuing memory 2 should be able to store at least three frames of data to allow for a frame offset by an increment of one frame. More memory storage can be provided in the queuing memory 2 to store additional frames of data.

Furthermore, the input pointer generator 18 of FIG. 1 may be synchronized to a clock (not shown) in the multi-port physical layer device 34 of FIG. 2. The input pointer generator 18 can be adapted to generate an input pointer which may be used as the input address for the queuing memory 2 when a frame of data is received by the physical layer device 34 and parsed by the parser 42. The frames can be consecutively numbered with a particular frame number assigned to each of the frames. The frame numbers can be used as a basis for the input address of the queuing memory 2 in FIG. 1. If no address collision is detected by the address collision detector 16, the input pointer can be relayed to the input address port 8 of the queuing memory 2 through the frame offset device 14 without any frame offset. If an address collision is detected, a frame offset is conveyed from the address collision detector 16 to the frame offset device 14, which adds the frame offset to the input pointer to generate a new input address for the queuing memory 2. If an address collision still occurs, the frame offset is further increased by the address collision detector 16 to change the input address until the address collision is avoided.

The output counter generator 20 of FIG. 1 can be synchronized to the access system 28 of FIG. 2 to generate an output counter based on the preceding frame which contains the data that has been outputted from the queuing memory 2 to the receive interface 38. The output counter generator 20 therefore generates an output counter as an output address for the preceding frame which has been outputted from the queuing memory 2 through the output data port 6 independent of the input pointer generator 18. The output counter generator 20 may generate an output counter based upon counting the frame number received by the access system 28 through the receive interface 38. If the queuing memory 2 itself has no appreciable time delay, the input pointer and the output counter may be set to differ by one frame number. If the queuing memory 2 itself has a delay, which is usually the case, the input pointer and the output counter may be set to differ by one frame more than the number of frames of delay in the queuing memory 2. For example, if the queuing memory 2 is designed such that there is a delay of two frames between the output data port 6 and the input data port 4, the output counter and the input pointer may be set to differ by three frames when the frames are properly queued. The address collision detector 16 or the frame delay device 14 may be designed to take the inherent frame delay of the queuing memory 2 into the account so that the input and output addresses differ by at least one frame more than the number of frames of inherent delay in the queuing memory 2. The input data port 4 of the queuing memory 2 may be directly connected to the parser 42, and the output data port 6 may be directly connected to the SONET receive interface 38.

Figure 3:
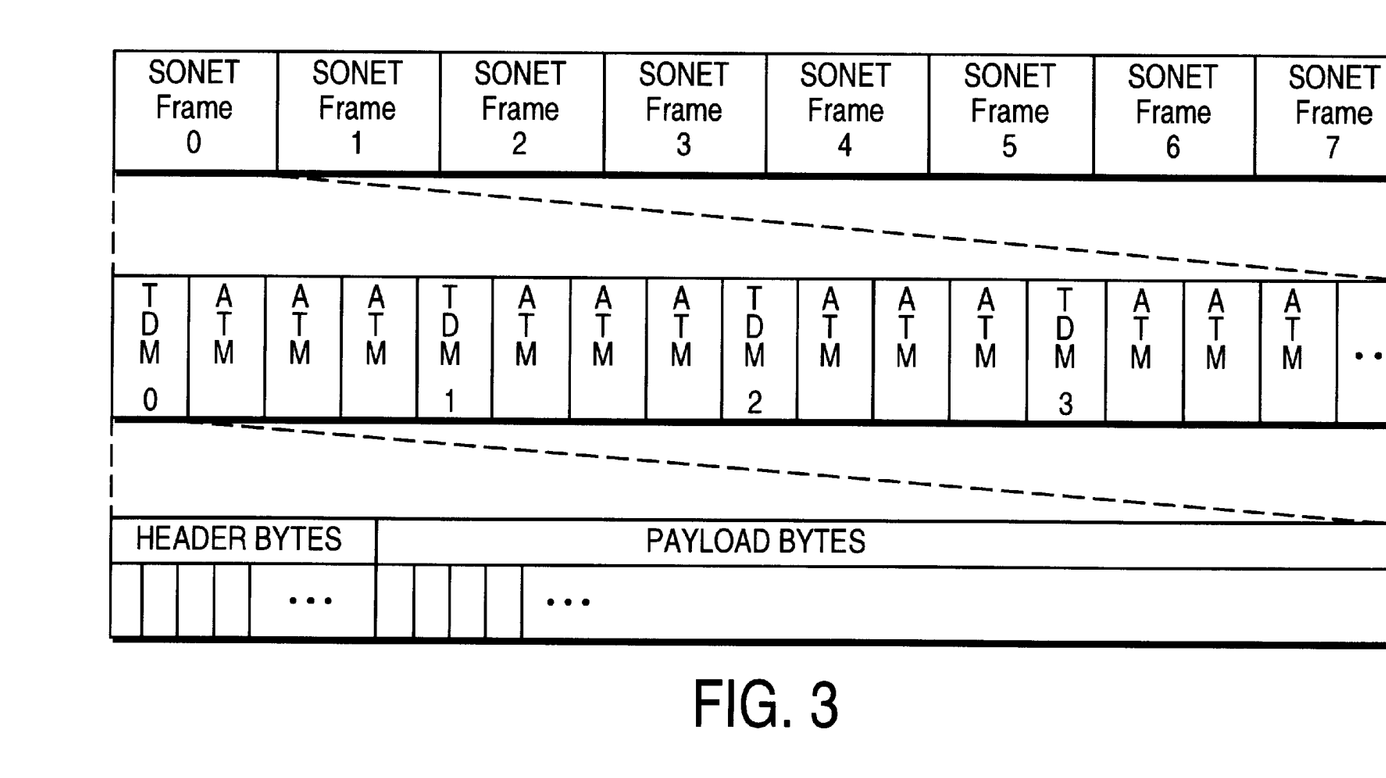
FIG. 3 is a diagram showing an example of a data format for the SONET frames which may be queued by the queuing apparatus according to the present invention.

FIG. 3 illustrates a typical SONET frame format which can be queued to avoid an address collision by the queuing apparatus according to the present invention. A SONET frame such as SONET Frame 0 comprises a plurality of TDM cells interspersed by a plurality of ATM cells. The TDM cells, which may be adapted to carry telephony signals, may be converted into the ATM format so that they are compatible for ATM transmission in the SONET frames over a SONET physical layer interface. The ATM cells other than those converted from the TDM cells carrying telephony signals may be adapted to carry video signals or computer data signals, which are provided in an asynchronous format. TDM data which have been formatted into an ATM cell typically includes a plurality of header bytes and a plurality of payload bytes. For example, a TDM cell may comprise 5 header bytes followed by 48 payload bytes. It is usually desirable that a TDM cell in one frame not collide with a TDM cell in another frame when the frames are received by the receive interface 38 of FIG. 2. The queuing apparatus 40 according to the present invention is able to delay a succeeding frame in time to avoid a collision with its preceding frame by offsetting the succeeding frame by at least one frame. For example, if some of the cells in SONET Frame 1 collides with some of the cells in SONET Frame 0, SONET Frame 1 is delayed by one frame duration such that it occupies the time slot of SONET Frame 2. Since the frame offset device 14 in FIG. 1 offsets the address of a succeeding frame relative to its preceding frame, a delay of only one frame is needed to avoid an address collision between immediately adjacent frames. However, if the frames overlap by more than one frame, additional frame delays are required.

The present invention also provides a method of queuing a plurality of frames including a preceding frame and a succeeding frame, roughly comprising the steps of:

(a) receiving the plurality of frames;

(b) detecting an address collision between the preceding and the succeeding frames; and (c) repositioning at least some of the frames to eliminate the address collision.

If an address collision still occurs, steps (b) through (c) may be repeated until the address collision is eliminated. For example, when the address collision detector 16 in FIG. 1 finds a collision between the input and output addresses, a frame offset is generated to correct the input address until the input and output addresses are different by at least one to delay the data received at the input data port 4 of the queuing memory 2 by at least one frame duration. If the queuing memory 2 in FIG. 1 has a number of frames of inherent delay, the input and output addresses should differ by at least one frame more than the number of frames of inherent delay in the queuing memory 2 to avoid an address collision. The step of repositioning at least some of the frames may comprise the step of offsetting the succeeding frame with respect to the preceding frame by a delay of at least one frame duration. The succeeding frame may be offset from the preceding frame by an increment of one frame at a time until the address collision is avoided.

Figure 4:
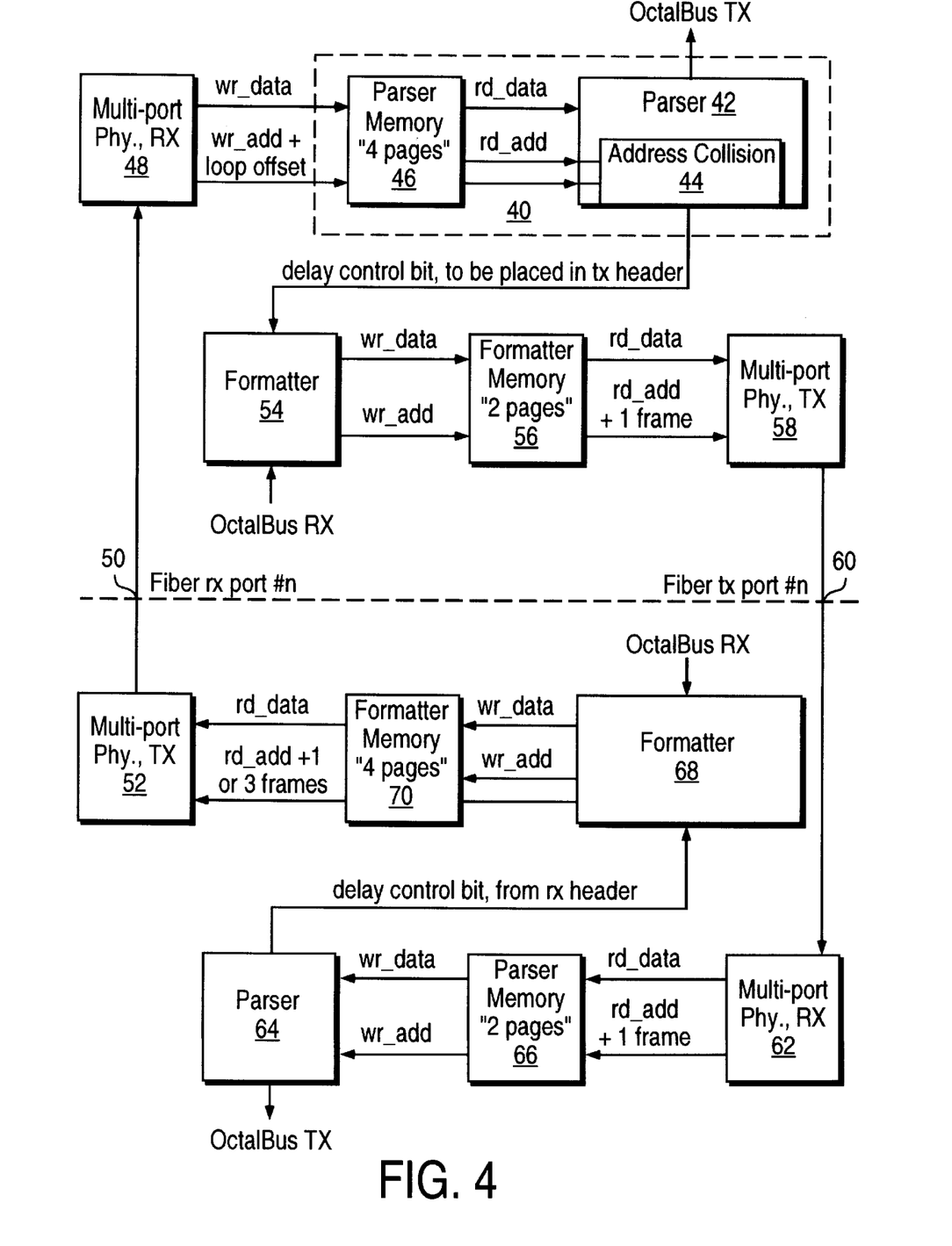
FIG. 4 is a block diagram showing a further embodiment of a SONET communication system in which the queuing apparatus according to the present invention may be implemented.

FIG. 4 is a block diagram illustrating another embodiment of a SONET communication system in which the queuing apparatus according to the present invention may be implemented. In this embodiment, the queuing apparatus 40 is integrated with the parser 42 of FIG. 2, with a data address collision detector 44 embedded in the parser 42. The queuing apparatus 40 further includes a parser memory 46 which is used to perform the function of the queuing memory 2 of FIG. 1. A multi-port physical layer receive interface 48, which is connected through an optical fiber receive port 50 to a multi-port physical layer transmit interface 52, sends write data, denoted as "wr_data," and the write address for the write data with a loop offset denoted as "wr_add+loop offset" in FIG. 4, to the parser memory 46. The parser memory 46 should have sufficient memory storage for multiple pages of data, for example at least four pages of data, each page containing one or more frames.

The parser memory 46 has a data output port for outputting the read data, denoted as "rd_data" in FIG. 4, to the parser 42, and an address output port for outputting the read address, denoted as "rd_add" in FIG. 4, to the address collision detector 44 in the parser 42. The write address including the loop offset denoted by "wr_add+loop offset" is relayed by the parser memory 46 to the address collision detector 44. Upon detecting an address collision, the address collision detector 44 transmits a delay control signal in one bit to a formatter 54 which is connected to a SONET octal bus receive interface. The delay control bit can be placed in one of the header bytes in the TDM cell, the address of which has collided with that of another TDM cell. The formatter 54 writes the formatted cell data by sending "wr_data" and "wr_add" signals to a formatter memory 56, which usually includes a sufficient memory storage for at least two pages of cell data. The formatter memory 56 is also connected to transmit the read data and the read address with a increment of one frame, denoted as "rd_data" and "rd add+1 frame," respectively, to another multi-port physical layer transmit interface 58.

The multi-port physical layer transmit interface 58 is connected through an optical fiber transmit port 60 to transmit data signals to a second multi-port physical layer receive interface 62 in the downstream direction. A second parser 64, which is connected to a SONET octal bus transmit interface, is connected through a write data port and a write address port to receive "wr_data" and "wr_add" signals, respectively, from a second parser memory 66, which is capable of storing at least two pages of data. The parser memory 66 is connected to the multi-port physical layer receive interface 62 through a read data port and a read address port, for receiving the "rd_data" and "rd_add+1 frame" signals, respectively. The read address received by the parser memory 66 includes an offset of the address by an increment of one frame.

The second parser 64 generates a delay control signal, which is contained in the delay control bit generated by the address collision detector 44 of the first parser 42, to a second formatter 68. The delay control bit can be placed in the header bytes of the TDM cell. The second formatter 68 is connected to the SONET octal bus receive interface and is further connected to transmit "wr_data" and "wr_add" signals to a second formatter memory 70, which is connected to the multi-port physical layer transmit interface 52. The formatter memory 70 includes a sufficient memory storage to store multiple pages of data and is usually capable of storing at least four pages of data. The formatter memory 70 has a read data port and a read address port for outputting the "rd_data" and "rd_add+1 or 3 frames" signals, respectively, to the multi-port physical layer transmit interface 52. The read address signal includes the read address offset by an increment of either one frame or three frames. The multi-port physical layer transmit interface 52 is in turn connected to the multi-port physical layer receive interface 48 through the optical fiber transmit port 50, thereby forming a loop of multi-port physical layer interfaces 48, 58, 62 and 52.

In this embodiment, the collision detection method employed by the queuing apparatus of the previous embodiments is also applicable to the offsetting of the data address to produce a delay of the frames. This embodiment allows for realignment of data frames with static frame delays due to different lengths of the optical fibers. The embodiment also allows for realignment of data frames upon detecting an address collision caused by dynamic factors which may alter the proper sequence of the data frames in the physical layer interface loop. Two valid states which include either one frame or three frames of overall delay are allowed at the transmit end, that is, the multi-port physical layer transmit interface 52. This embodiment also allows for frame alignments at both the sending and receiving ends of the interface while requiring no more than four frames of buffer in each of the memories at either end. This loop is able to avoid placing input data into the same page in either the parser memory 46 or the formatter memory 70 as the data frames are processed at the octal bus interfaces. The two frame adjustment granularity guarantees "hysteresis" when the loop length is static, which is generally the case in a typical deployed telephony system. After the system is initialized, data collisions due to static frame delays will be eliminated, thereby automatically equalizing the effective loop length. Frame realignments due to static delays need only be performed once while in operation until the system is re-initialized.

The invention has been described with respect to particular embodiments thereof, and numerous modifications can be made which are within the scope of the invention as set forth in the claims. For example, whereas the embodiments described herein involve the delay of the subsequent frame by an integral number of frames in one frame increments, it will be appreciated that the principles of the invention can be used also with offsetting the succeeding frame by a time period other than an integral number of frame durations.

What is claimed is:

1. A queuing apparatus, comprising:
   (a) a queuing memory capable of storing a plurality of frames including a preceding frame and a succeeding frame, the queuing memory including an input address port and an output address port;
   (b) a frame offset device coupled to the input address port of the queuing memory; and
   (c) an address collision detector coupled to the input and output address ports of the queuing memory to detect an address collision between the preceding and succeeding frames, and further coupled to the frame offset device to offset the succeeding frame in response to detecting the address collision.

2. The apparatus of claim 1, wherein the queuing memory further comprises an input data port coupled to receive the plurality of frames and an output data port for outputting the frames in a temporal sequence.

3. The apparatus of claim 1, further comprising an input pointer generator coupled to convey an input pointer signal to the frame offset device.

4. The apparatus of claim 3, wherein the queuing memory further comprises a write port and the input pointer generator is further coupled to the write port.

5. The apparatus of claim 1, further comprising an output counter generator coupled to the output address port of the queuing memory and to the address collision detector.

6. The apparatus of claim 1, wherein the address collision detector is coupled to generate a frame offset signal to the frame offset device to offset the succeeding frame.

7. The apparatus of claim 6, wherein the frame offset device is coupled to delay the succeeding frame by at least one frame in response to the frame offset signal.

8. The apparatus of claim 6, wherein the address collision detector comprises a monostable multivibrator.

9. The apparatus of claim 1, wherein the queuing memory is capable of storing at least three frames.

10. An apparatus for communicating a plurality of frames including a preceding frame and a succeeding frame, comprising:
(a) a transmitter for transmitting the plurality of frames;
(b) a queuing apparatus coupled to the transmitter, comprising:
(i) a queuing memory capable of storing a plurality of frames, the queuing memory including an input address port and an output address port;
(ii) a frame offset device coupled to the input address port of the queuing memory; and
(iii) an address collision detector coupled to the input and output address ports of the queuing memory to detect an address collision between the preceding and succeeding frames, and further coupled to the frame offset device to offset the succeeding frame in response to detecting the address collision; and
(c) a receiver coupled to receive the plurality of frames from the queuing apparatus.

11. The apparatus of claim 10, wherein the queuing memory further comprises an input data port coupled to receive the plurality of frames and an output data port for outputting the frames in a temporal sequence.

12. The apparatus of claim 11, further comprising a physical layer device coupled between the transmitter and the queuing apparatus to transmit the plurality of frames from the transmitter in a downstream direction and to receive the plurality of frames in an upstream direction opposite the downstream direction.

13. The apparatus of claim 12, wherein the queuing apparatus further comprises an input pointer generator coupled to the frame offset device and synchronized to the physical layer device.

14. The apparatus of claim 12, further comprising a formatter coupled to receive the plurality of frames from the transmitter and to transmit a plurality of formatted frames to the physical layer device.

15. The apparatus of claim 12, further comprising a parser coupled to receive the plurality of frames in the upstream direction from the physical layer device to parse the plurality of frames into a plurality of single port queues.

16. The apparatus of claim 15, wherein the parser is connected to the queuing memory.

17. The apparatus of claim 16, wherein the parser is directly connected to the input data port of the queuing memory.

18. The apparatus of claim 11, wherein the receiver is connected to the queuing memory.

19. The apparatus of claim 18, wherein the receiver is directly connected to the output data port of the queuing memory.

20. The apparatus of claim 10, wherein the queuing apparatus further comprises an input pointer generator coupled to convey an input pointer signal to the frame offset device.

21. The apparatus of claim 20, wherein the queuing memory further comprises a write port and the input pointer generator is further coupled to the write port.

22. The apparatus of claim 10, wherein the queuing apparatus further comprises an output counter generator coupled to the output address port of the queuing memory and to the address collision detector.

23. The apparatus of claim 22, wherein the output counter generator is synchronized to the receiver.

24. The apparatus of claim 10, wherein the address collision detector is coupled to generate a frame offset signal to the frame offset device to offset the succeeding frame.

25. The apparatus of claim 24, wherein the frame offset device is coupled to delay the succeeding frame by at least one frame in response to the frame offset signal.

26. The apparatus of claim 24, wherein the address collision detector comprises a monostable multivibrator.

27. The apparatus of claim 10, wherein the queuing memory is capable of storing at least three frames.

28. An apparatus for queuing a plurality of frames including a preceding frame and a succeeding frame, the apparatus comprising:
(a) a queuing memory capable of storing the plurality of frames, the queuing memory including an input address port, an output address port, an input data port coupled to receive the plurality of frames, and an output data port for outputting the frames in a temporal sequence;
(b) a frame offset device coupled to the input address port of the queuing memory; and
(c) an address collision detector coupled to the input and output address ports of the queuing memory to detect an address collision between the preceding and succeeding frames, and further coupled to the frame offset device to offset the succeeding frame in response to detecting the address collision.

29. The apparatus of claim 28, further comprising an input pointer generator coupled to convey an input pointer signal to the frame offset device.

30. The apparatus of claim 29, wherein the queuing memory further comprises a write port and the input pointer generator is further coupled to the write port.

31. The apparatus of claim 28, further comprising an output counter generator coupled to the output address port of the queuing memory and to the address collision detector.

32. The apparatus of claim 28, wherein the address collision detector is coupled to generate a frame offset signal to the frame offset device to offset the succeeding frame.

33. The apparatus of claim 32, wherein the frame offset device is coupled to delay the succeeding frame by at least one frame in response to the frame offset signal.

34. The apparatus of claim 32, wherein the address collision detector comprises a monostable multivibrator.

35. The apparatus of claim 28, wherein the queuing memory is capable of storing at least three frames.

36. An apparatus for communicating a plurality of frames including a preceding frame and a succeeding frame, the apparatus comprising:
(a) a transmitter for transmitting the plurality of frames;
(b) a queuing apparatus coupled to the transmitter, comprising:
(i) a queuing memory capable of storing a plurality of frames, the queuing memory including an input address port, an output address port, an input data port coupled to receive the plurality of frames, and an output data port for outputting the frames in a temporal sequence;
(ii) a frame offset device coupled to the input address port of the queuing memory; and
(iii) an address collision detector coupled to the input and output address ports of the queuing memory to detect an address collision between the preceding and succeeding frames, and further coupled to the frame offset device to offset the succeeding frame in response to detecting the address collision; and (c) a receiver coupled to receive the plurality of frames from the queuing apparatus.

37. The apparatus of claim 36, wherein the queuing apparatus further comprises an input pointer generator coupled to convey an input pointer signal to the frame offset device.

38. The apparatus of claim 37, wherein the queuing memory further comprises a write port and the input pointer generator is further coupled to the write port.

39. The apparatus of claim 36, wherein the queuing apparatus further comprises an output counter generator coupled to the output address port of the queuing memory and to the address collision detector.

40. The apparatus of claim 39, wherein the output counter generator is synchronized to the receiver.

41. The apparatus of claim 36, wherein the address collision detector is coupled to generate a frame offset signal to the frame offset device to offset the succeeding frame.

42. The apparatus of claim 41, wherein the frame offset device is coupled to delay the succeeding frame by at least one frame in response to the frame offset signal.

43. The apparatus of claim 41, wherein the address collision detector comprises a monostable multivibrator.

44. The apparatus of claim 36, further comprising a physical layer device coupled between the transmitter and the queuing apparatus to transmit the plurality of frames from the transmitter in a downstream direction and to receive the plurality of frames in an upstream direction opposite the downstream direction.

45. The apparatus of claim 44, wherein the queuing apparatus further comprises an input pointer generator coupled to the frame offset device and synchronized to the physical layer device.

46. The apparatus of claim 44, further comprising a formatter coupled to receive the plurality of frames from the transmitter and to transmit a plurality of formatted frames to the physical layer device.

47. The apparatus of claim 44, further comprising a parser coupled to receive the plurality of frames in the upstream direction from the physical layer device to parse the plurality of frames into a plurality of single port queues.

48. The apparatus of claim 47, wherein the parser is connected to the queuing memory.

49. The apparatus of claim 48, wherein the parser is directly connected to the input data port of the queuing memory.

50. The apparatus of claim 36, wherein the receiver is connected to the queuing memory.

51. The apparatus of claim 50, wherein the receiver is directly connected to the output data port of the queuing memory.

52. The apparatus of claim 36, wherein the queuing memory is capable of storing at least three frames.

53. A queuing apparatus, comprising:
(a) a queuing memory capable of storing a plurality of frames including a preceding frame and a succeeding frame, the queuing memory including an input address port, an output address port, an input data port coupled to receive the plurality of frames, and an output data port for outputting the frames in a temporal sequence;
(b) a frame offset device coupled to the input address port of the queuing memory;
(c) an address collision detector coupled to the input and output address ports of the queuing memory to detect an address collision between the preceding and succeeding frames, and further coupled to the frame offset device to offset the succeeding frame in response to detecting the address collision;
(d) an input pointer generator coupled to convey an input pointer signal to the frame offset device; and
(e) an output counter generator coupled to the output address port of the queuing memory and to the address collision detector.

54. The apparatus of claim 53, wherein the queuing memory further comprises a write port and the input pointer generator is further coupled to the write port.

55. The apparatus of claim 53, wherein the address collision detector is coupled to generate a frame offset signal in at least one frame increment to offset the succeeding frame.

56. The apparatus of claim 55, wherein the frame offset device is coupled to delay the succeeding frame by at least one frame in response to the frame offset signal.

57. The apparatus of claim 53, wherein the address collision detector comprises a monostable multivibrator.

58. The apparatus of claim 53, wherein the queuing memory is capable of storing at least three frames.

59. An apparatus for communicating a plurality of frames, comprising:
(a) a transmitter for transmitting the plurality of frames including a preceding frame and a succeeding frame;
(b) a queuing apparatus coupled to the transmitter, comprising:
(i) a queuing memory capable of storing a plurality of frames, the queuing memory including an input address port, an output address port, an input data port coupled to receive the plurality of frames, and an output data port for outputting the frames in a temporal sequence;
(ii) a frame offset device coupled to the input address port of the queuing memory;
(iii) an address collision detector coupled to the input and output address ports of the queuing memory to detect an address collision between the preceding and succeeding frames, and further coupled to the frame offset device to offset the succeeding frame in response to detecting the address collision;
(iv) an input pointer generator coupled to convey an input pointer signal to the frame offset device; and
(v) an output counter generator coupled to the output address port of the queuing memory and to the address collision detector; and
(c) a receiver coupled to receive the plurality of frames from the queuing apparatus.

60. The apparatus of claim 59, wherein the queuing memory further comprises a write port and the input pointer generator is further coupled to the write port.

61. The apparatus of claim 59, wherein the address collision detector is coupled to generate a frame offset signal to the frame offset device to offset the succeeding frame.

62. The apparatus of claim 61, wherein the frame offset device is coupled to delay the succeeding frame by at least one frame in response to the frame offset signal.

63. The apparatus of claim 59, wherein the address collision detector comprises a monostable multivibrator.

64. The apparatus of claim 59, further comprising a physical layer device coupled between the transmitter and the queuing apparatus to transmit the plurality of frames from the transmitter in a downstream direction and to receive the plurality of frames in an upstream direction opposite the downstream direction.

65. The apparatus of claim 64, wherein the input pointer generator is synchronized to the physical layer device.

66. The apparatus of claim 64, further comprising a formatter coupled to receive the plurality of frames from the transmitter and to transmit a plurality of formatted frames to the physical layer device.

67. The apparatus of claim 64, further comprising a parser coupled to receive the plurality of frames in the upstream direction from the physical layer device to parse the plurality of frames into a plurality of single port queues.

68. The apparatus of claim 67, wherein the parser is connected to the input data port of the queuing memory.

69. The apparatus of claim 59, wherein the receiver is connected to the output data port of the queuing memory.

70. The apparatus of claim 59, wherein the output counter generator is synchronized to the receiver.

71. The apparatus of claim 59, wherein the queuing memory is capable of storing at least three frames.

72. A method of queuing a plurality of frames including a preceding frame and a succeeding frame, comprising the steps of:
(a) receiving the plurality of frames;
(b) detecting an address collision between the preceding and succeeding frames; and
(c) repositioning at least some of the frames to eliminate the address collision.

73. The method of claim 72, further comprising the step of repeating steps (b) through (c).

74. The method of claim 72, wherein the step of repositioning at least some of the frames comprises the step of offsetting the succeeding frame with respect to the preceding frame.

75. The method of claim 74, wherein the step of offsetting the succeeding frame comprises the step of delaying the succeeding frame by at least one frame.

76. A method of queuing a plurality of frames including a preceding frame and a succeeding frame each referenced by an address, comprising the steps of:
(a) receiving the plurality of frames;
(b) determining whether the address of the succeeding frame collides with that of the preceding frame;
(c) delaying the succeeding frame by at least one frame if the address of the succeeding frame collides with that of the preceding frame; and
(d) repeating steps (b) through (c).

77. An apparatus for communicating a plurality of frames, comprising:
(a) a first physical layer receive interface;
(b) a queuing apparatus coupled to the first physical layer receive interface, the queuing apparatus capable of receiving a loop offset from the first physical layer receive interface and generating a delay control signal upon detecting an address collision between at least two of the frames;
(c) a first physical layer transmit interface coupled to the queuing apparatus;
(d) a second physical layer receive interface coupled to receive the frames from the first physical layer transmit interface; and
(e) a second physical layer transmit interface coupled to receive the frames from the second physical layer receive interface and further coupled to transmit the frames to the first physical layer receive interface.

78. The apparatus of claim 77, wherein the queuing apparatus comprises:
(i) a first parser including an address collision detector; and
(ii) a first parser memory connected to receive write data and a write address with a loop offset for the write data from the first physical layer receive interface, and further connected to output read data and a read address for the read data to the first parser.

79. The apparatus of claim 78, wherein the address collision detector is connected to receive the read address and the write address with the loop offset from the first parser memory, and to generate the delay control signal upon detecting an address collision between the read address and the write address with the loop offset.

80. The apparatus of claim 79, further comprising a first formatter connected to receive the delay control signal from the address collision detector.

81. The apparatus of claim 80, further comprising a first formatter memory connected to receive the write data and the write address for the write data from the first formatter and capable of formatting the write data into formatted read data and generating a read address with an offset of one frame for the read data.

82. The apparatus of claim 81, wherein the first physical layer transmit interface is connected to receive the read data and the read address with the offset of one frame from the first formatter memory.

83. The apparatus of claim 81, wherein the first formatter memory is capable of storing at least two frames.

84. The apparatus of claim 78, wherein the first parser memory is capable of storing at least four frames.

85. The apparatus of claim 77, further comprising:
(i) a second parser memory coupled to receive the read data and the read address with the offset of one frame from the second physical layer receive interface and capable of generating the write data and the write address for the write data; and
(ii) a second parser connected to receive the write data and the write address for the write data from the second parser memory and further coupled to provide the delay control signal generated by the address collision detector of the first parser.

86. The apparatus of claim 85, further comprising a second formatter connected to receive the delay control signal from the second parser.

87. The apparatus of claim 86, further comprising a second formatter memory connected to receive the write data and the write address for the write data from the second formatter, and further coupled to output formatted read data to the second physical layer transmit interface.

88. The apparatus of claim 87, wherein the second physical layer transmit interface is further coupled to receive the read address with an offset of one frame from the second formatter memory.

89. The apparatus of claim 87, wherein the second physical layer transmit interface is further coupled to receive the read address with an offset of three frames from the second formatter memory.

90. The apparatus of claim 87, wherein the second formatter memory is capable of storing at least four frames.

91. The apparatus of claim 85, wherein the second parser memory is capable of storing at least two frames.

92. The apparatus of claim 77, further comprising an optical fiber receive port connected between the first physical layer receive interface and the second physical layer transmit interface.

93. The apparatus of claim 77, further comprising an optical fiber transmit port connected between the first physical layer transmit interface and the second physical layer receive interface.

* * * * *